UNITED STATES PATENT OFFICE.

HENRY McCARTY, OF PITTSBURG, PENNSYLVANIA.

IMPROVED METHOD OF HEATING SHEET-IRON WHILE IN THE PROCESS OF MANUFACTURE.

Specification forming part of Letters Patent No. 9,075, dated June 29, 1852.

*To all whom it may concern:*

Be it known that I, HENRY McCARTY, of the city of Pittsburg, in the county of Allegheny and State of Pennsylvania, have invented a new and useful Improvement in the Manufacture of Sheet-Iron; and I do hereby declare the following to be a full and clear description of the process of said manufacture.

My invention relates to an improvement in the manufacture of thin plates or sheets of iron suitable for various uses, and imparting to them that beautiful finish and durable gloss and luster heretofore peculiar to the Russia sheet-iron; and in order that my invention and improvement may be fully understood and readily carried into effect I will proceed to explain the means and process pursued by me.

I take sheets of iron prepared in the usual manner and clean them with muriatic acid and zinc placed in a leaden pan, the immersion taking place as soon as a lively or active effervescence appears. Then I withdraw the plates and wash them with water to remove the acid, and dry them. The plates thus prepared are ready for the heating process, which is effected by immersing them in melted lead or other suitable liquified substance serving to exclude the air from the surface of the iron. After the plates have remained in the liquid till they are sufficiently heated they are passed between rollers arranged similar to the rollers of a common rolling-mill in order to produce a smooth glossy surface resembling that of the imported Russia sheet-iron. The mottled marks or spots on the surface similar to those generally found on the surface of the above-named sheets of iron are produced by the rollers, which are hammers dressed upon their convex surfaces. The melted lead should be red-hot when the sheets of iron are immersed, so as to render them of a cherry-red when withdrawn from the bath. As the plates are rendered rather rough and uneven by the process of removing the scales, the rolling is necessary to produce a smooth surface and reduce them to an even thickness, the rollers acting rather as planishers than as reducers, although the iron must necessarily be somewhat reduced in thickness by the rolling operation. Among the other liquefied substances mentioned as substitute for lead is an alloy of lead and tin, which does not require so high a degree of temperature to melt as zinc.

Having thus described my improvement in the manufacture of sheet-iron, by which it is made to resemble the imported Russia sheet-iron and to possess that beautiful mottled gloss and smooth hard surface, what I claim as new and of my invention, and desire to secure by Letters Patent, is—

Heating the sheets of iron in a bath of hot lead instead of heating them in an oven, by which the surfaces of the sheets are protected from the oxygen in the atmosphere during the heating process preparatory to the rolling operation.

In testimony whereof I have hereunto signed my name before two subscribing witnesses.

HENRY McCARTY.

Witnesses:
WM. P. ELLIOT,
J. S. SMITH.